(12) United States Patent
Strong

(10) Patent No.: US 12,405,154 B2
(45) Date of Patent: Sep. 2, 2025

(54) WIRELESS SCALE SYSTEM

(71) Applicant: Brooks Strong, Houston, TX (US)

(72) Inventor: Brooks Strong, Houston, TX (US)

( * ) Notice: Subject to any disclaimer, the term of this patent is extended or adjusted under 35 U.S.C. 154(b) by 331 days.

(21) Appl. No.: 17/791,963

(22) PCT Filed: Jan. 10, 2021

(86) PCT No.: PCT/US2021/012870
§ 371 (c)(1),
(2) Date: Jul. 11, 2022

(87) PCT Pub. No.: WO2021/142396
PCT Pub. Date: Jul. 15, 2021

(65) Prior Publication Data
US 2023/0037956 A1    Feb. 9, 2023

Related U.S. Application Data

(60) Provisional application No. 62/959,713, filed on Jan. 10, 2020.

(51) Int. Cl.
*G01G 23/42*    (2006.01)
*G01G 23/37*    (2006.01)

(52) U.S. Cl.
CPC ......... *G01G 23/42* (2013.01); *G01G 23/3707* (2013.01)

(58) Field of Classification Search
CPC .... G01G 23/42; G01G 23/3707; G01G 19/52; G01G 23/18; G01G 23/37
See application file for complete search history.

(56) References Cited

U.S. PATENT DOCUMENTS

| | | | |
|---|---|---|---|
| 4,128,001 A | 12/1978 | Marks | |
| 4,815,547 A * | 3/1989 | Dillon | G01G 3/18 73/1.13 |
| 4,992,775 A * | 2/1991 | Castle | G08B 25/14 340/505 |
| 7,151,230 B2 * | 12/2006 | Brighenti | G01G 23/01 177/25.14 |
| 8,648,266 B2 * | 2/2014 | Bucher | G01G 23/3707 177/199 |
| 9,939,313 B2 * | 4/2018 | Dai | G01G 21/28 |
| 10,260,934 B2 * | 4/2019 | Esmail | G01G 19/52 |
| 2001/0047892 A1* | 12/2001 | Suzuki | G01G 19/08 177/136 |
| 2004/0026135 A1 | 2/2004 | Huitt et al. | |

(Continued)

FOREIGN PATENT DOCUMENTS

EP         1726926 A1 * 11/2006 ........... G01G 21/244

OTHER PUBLICATIONS

International Search Report and Written Opinion for International application No. PCT/US2021/012870, mailed May 12, 2021, 10 pages.

*Primary Examiner* — Natalie Huls
(74) *Attorney, Agent, or Firm* — Polsinelli PC

(57) ABSTRACT

A wireless scale apparatus can include a housing having one or more receiving portions formed therein, a printed circuit board (PCB) having a microprocessor coupled therewith, the PCB operably coupled with a power source, an antenna, and a load cell, wherein the microprocessor is operable to determine a load received upon the load cell.

18 Claims, 9 Drawing Sheets

(56) References Cited

U.S. PATENT DOCUMENTS

| | | | |
|---|---|---|---|
| 2010/0108406 A1* | 5/2010 | Wuerthner | G01G 19/086 |
| | | | 177/136 |
| 2013/0220708 A1* | 8/2013 | Kim | G01G 23/3735 |
| | | | 177/3 |
| 2014/0000969 A1* | 1/2014 | Carruthers | G06F 11/3013 |
| | | | 177/136 |
| 2015/0345280 A1 | 12/2015 | Krauss | |
| 2017/0307423 A1* | 10/2017 | Pahwa | G01G 19/18 |
| 2018/0008168 A1* | 1/2018 | Pearlman | A61B 5/002 |
| 2020/0124465 A1* | 4/2020 | Carraway | G01G 23/3735 |
| 2021/0048333 A1* | 2/2021 | Zhang | B60T 7/18 |
| 2022/0017160 A1* | 1/2022 | Hammou | B60G 17/0182 |
| 2022/0404191 A1* | 12/2022 | Arvind | G01G 23/18 |
| 2024/0011818 A1* | 1/2024 | Zeis | G01G 19/12 |

* cited by examiner

WIRELESS SCALE SYSTEM

CROSS REFERENCE TO RELATED APPLICATIONS

The present application is a National Stage entry of International Application No. PCT/US2021/012870, filed Jan. 10, 2021, which claims the benefit of U.S. Provisional Application No. 62/959,713, filed Jan. 10, 2020, the contents of which are incorporated herein in their entirety

FIELD

The present disclosure relates generally to a wireless scale device and related system, more particularly to wireless scale systems for load management.

BACKGROUND

Load management can improve efficiency by minimizing trip cost, reducing unnecessary wear on transport vehicles, while also preventing damage to a transport vehicle through excessive load. Load management systems are often inaccurate, which provide insufficient data to make informed load management decisions and can produce counterproductive results due to inadequate feedback, and/or are bulky wired systems requiring significant modification or installation time to a transport vehicle.

BRIEF DESCRIPTION OF THE DRAWINGS

Further features of the present disclosure will become apparent to those skilled in the art to which the present disclosure relates from reading the following specification with reference to the accompanying drawings, in which.

DETAILED DESCRIPTION

Figure 1A:
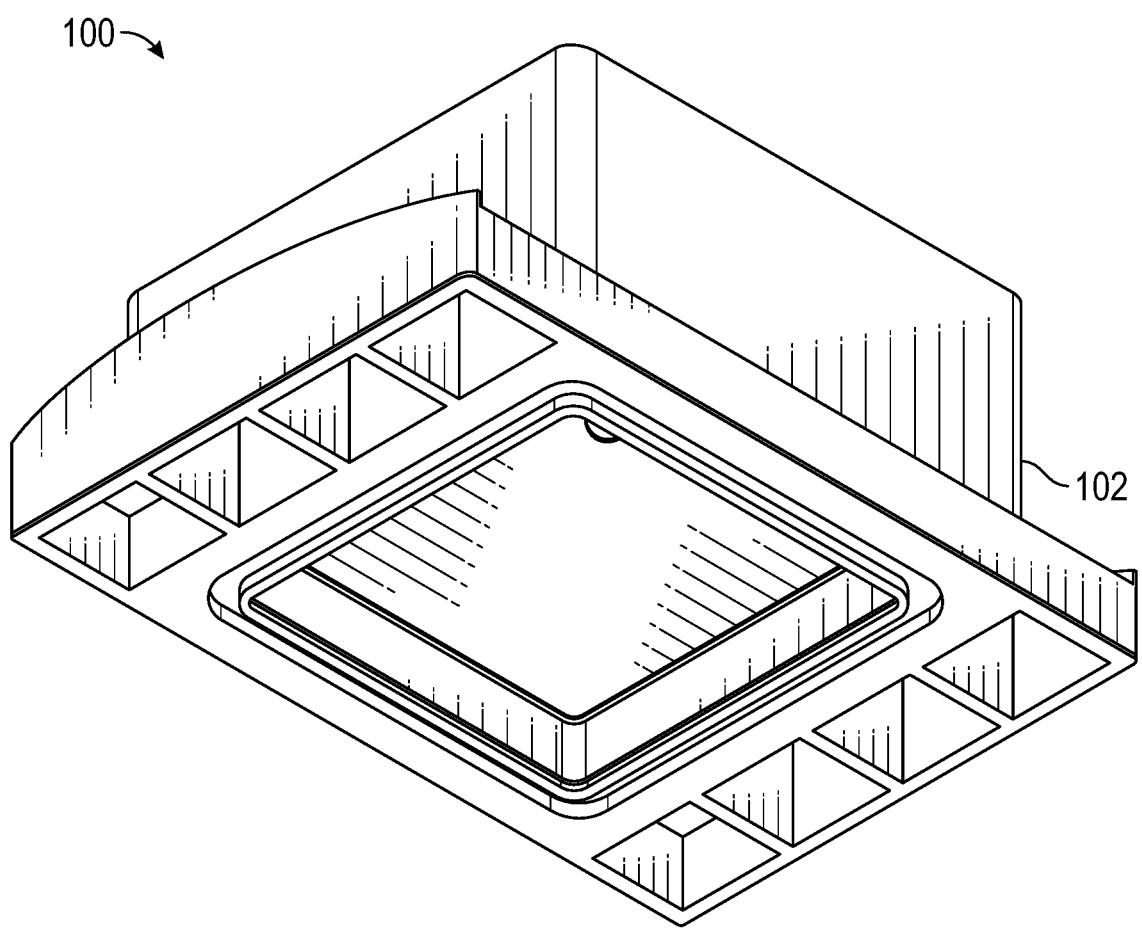
FIG. 1A is a bottom isometric view of a wireless scale system, according to at least one instance of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

While the present disclosure is drawn to a wireless scale system implemented with a load hauling vehicle, it is within the scope of this disclosure to implement the wireless scale system with any load capacity element including, but not limited to, bridges, cranes, forklifts, backhoes, buildings, roofing (e.g. roof monitoring), and/or any other load capacity or load measuring implementation.

FIG. 1A illustrates a wireless scale device according to at least one instance of the present disclosure. The wireless scale device 100 can have a housing 102 operable to receive one or more components therein. The housing 102 can be formed from plastic, polymers, composites, metals, and/or any other suitable material. The housing 102 can be molded, extruded, machined, or otherwise formed operably to receive the one or more components therein.

The housing 102 can provide protection for the one or more components from impacts, vibration, dirt, debris, environmental elements and/or other contaminants. As illustrated in more detail with respect to FIGS. 2-3, the one or more components can include a power source 110, a printed circuit board (PCB) 108, an antenna 112, and/or a load sensor 114.

In at least one instance, the load sensor 114 can be operable to be received in a receiving portion 106 formed along the bottom surface. The load sensor 114 can be operable engaged with an axle and/or other suspension element upon which a measurable load is to be received. The load sensor can be a strain gauge, a Wheatstone bridge, and/or any combination thereof.

Figure 1B:
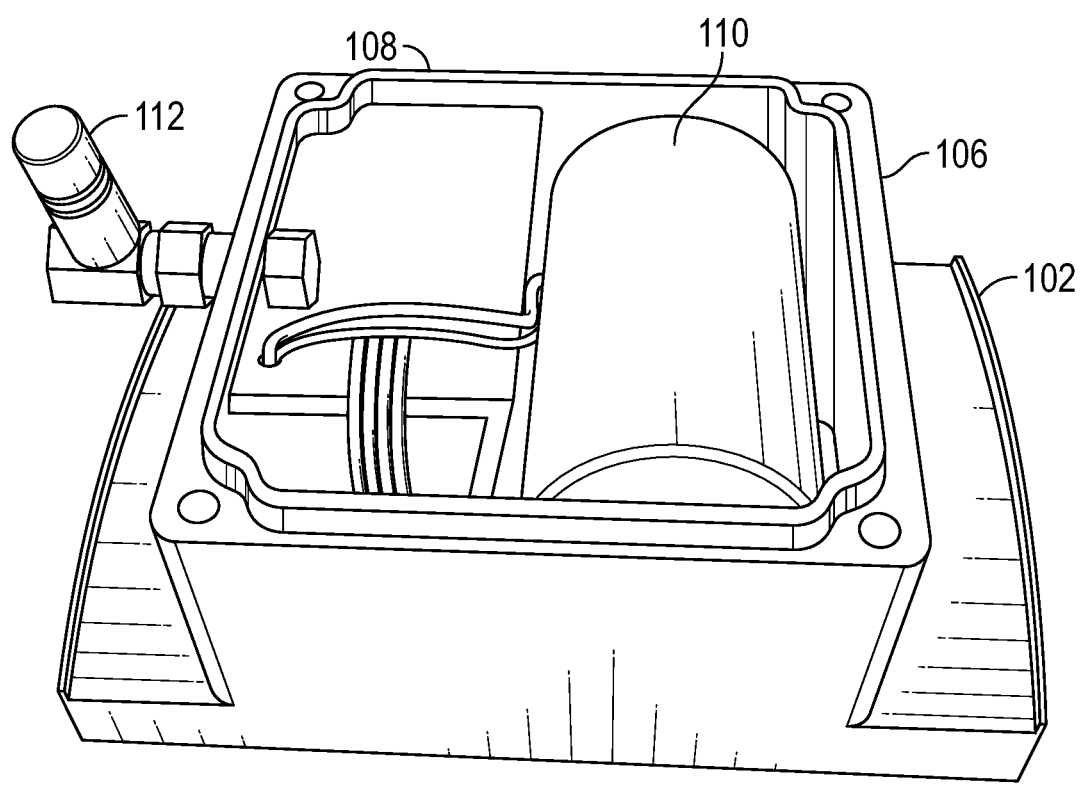
FIG. 1B is a top isometric view of a wireless scale system having a top housing removed, according to at least one instance of the present disclosure.

FIG. 1B illustrates a wireless scale system housing having a top cover removed according to at least one instance of the present disclosure. The housing 102 can have a removable top surface 104 (shown in FIG. 1C) covering one or more receiving portions 106 formed within the housing. The top surface 104 can engage with the housing 102 to seal the one or more receiving portions 106. In at least one instance, the top surface 104 can engage via one or more fasteners (e.g. screws, bolts, threaded fasteners, etc.). In other instances, the top surface 104 can engage via a snap-fit and/or pressure-fit engagement.

The one or more receiving portions 106 can be operably arranged to receive at least one of the one or more components therein. In at least one instance, the one or more receiving portions 106 can be can arranged to receive one of the one or more components, respectively. In other instances, the one or more receiving portions 106 can be arranged to receive one or all of the one or more components, respectively.

The housing 102 can have a printed circuit board (PCB) 108 and a power source 110 operably received within the one or more receiving portions 106. The PCB 108 can have a microprocessor, memory, and/or other computer components thereon and provide communicative coupling between the one or more components. In at least one instance, the PCB 108 can receive information from at least one of the one or more components and transmit information to another of the one or more components.

A power source 110 can also be received within at least a portion of the one or more receiving portions 106. The power source 110 can provide electrical power to the PCB 108, an antenna 112, and/or one or more of the one or more components. The power source 110 can be any rechargeable and/or non-rechargeable battery.

Figure 1C:
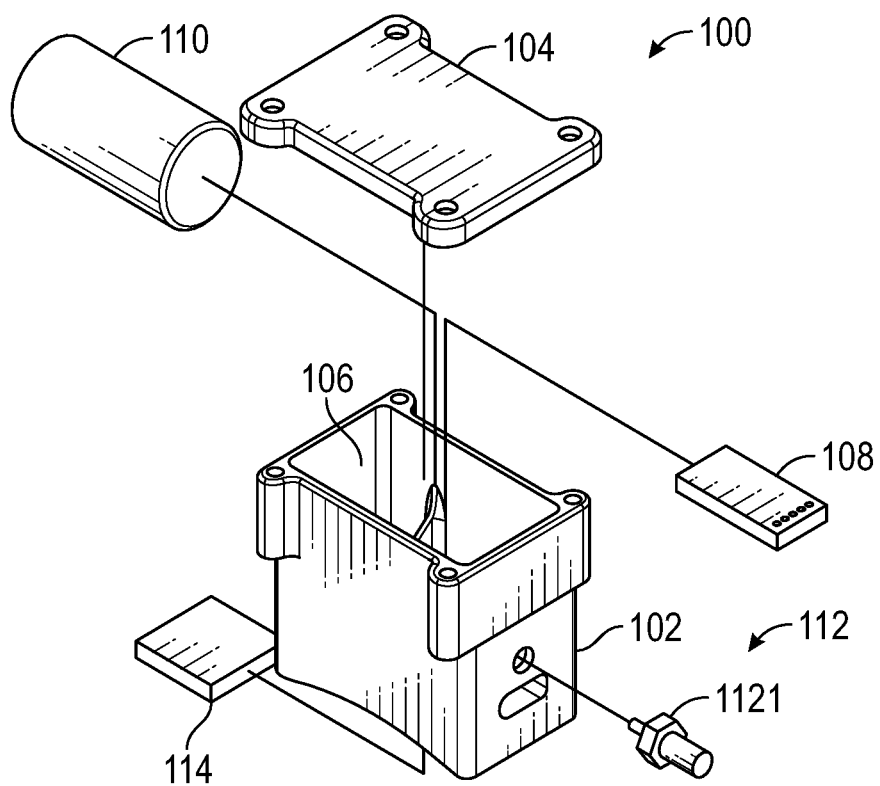
FIG. 1C is an exploded view of a wireless scale system of FIG. 1, according to at least one instance of the present disclosure.
Figure 10:
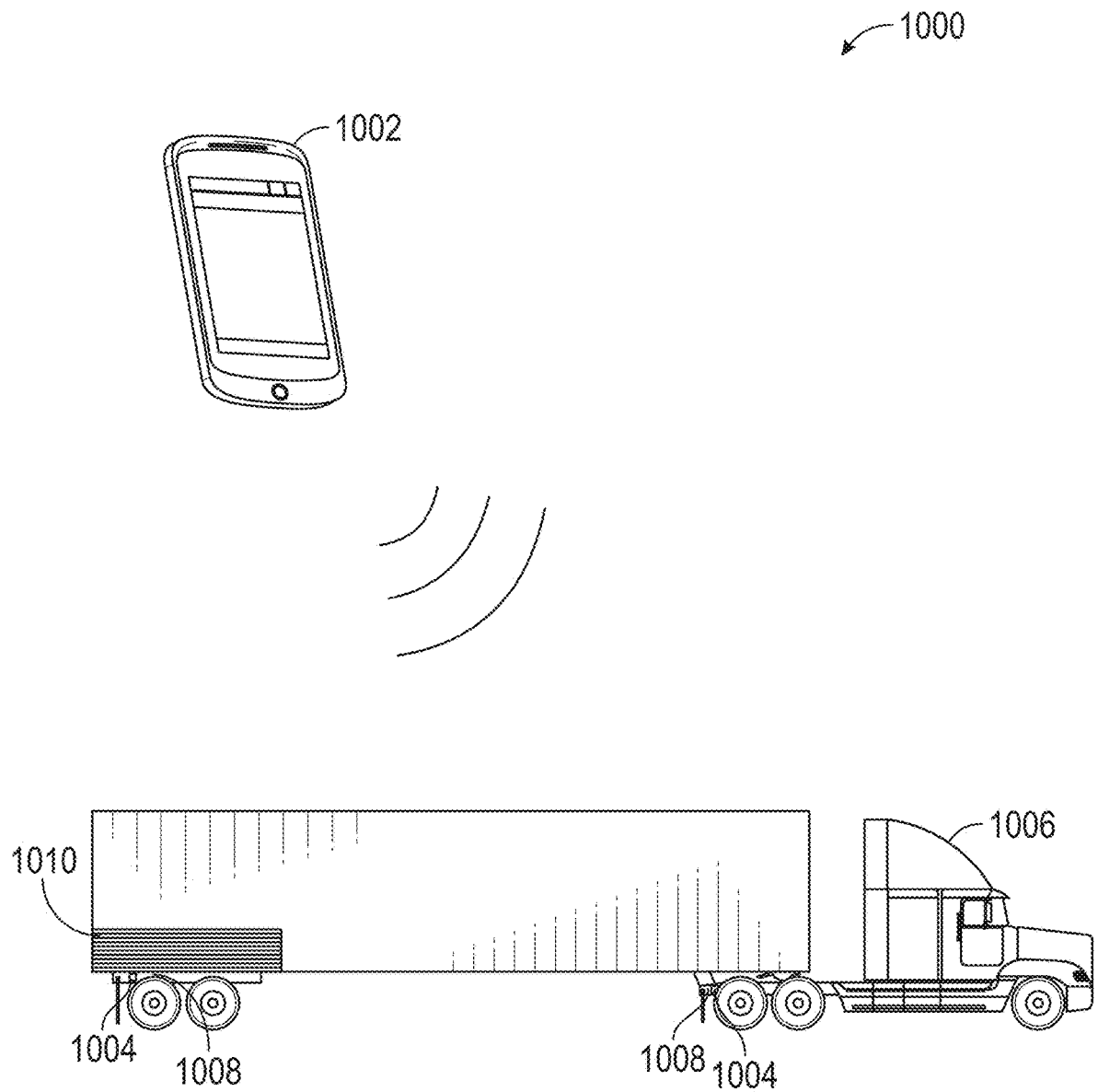
FIG. 10 is a diagrammatic view of a wireless scale system, according to at least one instance of the present disclosure.

FIG. 1C illustrates an exploded view of a wireless scale system, according to at least one instance of the present disclosure. The load sensor 114 can be operably to be engaged with a load receiving element 1008 (for example, an axle 1008 as shown in FIG. 10) upon which a measurable load 1010 can be received. The load sensor 114 can be a Wheatstone bridge arrangement, a strain gauge, and/or any combination thereof. In a Wheatstone bridge arrangement, an electrical circuit can be implemented to measure an unknown resistance by balancing two legs of a bridge circuit, one leg of which includes the unknown component. The unknown component can be the measurable load 1010, thus allowing the measurable load 1010 to be determined via the Wheatstone bridge.

As can be further appreciated in FIG. 1C, the housing 102 can have one or more receiving portions 106 operable to receive the PCB 108, the power source 110, the antenna 112, and/or any other component operably engaged with the wireless scale device 100. In at least one instance, the power source 110 can be a non-rechargeable battery. In other instances, the power source 110 can be a kinetic power source, a solar power source, a hybrid arrangement including a battery (e.g. rechargeable and/or non-rechargeable) and one or more of a kinetic and/or solar power source, and/or any other element operable to power the PCB.

In at least one instance, at least a portion of the antenna 112 can be operably arranged outside of the housing 102 to provide better communicative signal for the wireless scale device 100. The antenna 112 can have a connector 1121 operable to receive an external antenna, or the antenna 112 can be integrally formed with the housing 102, but protrude at least partially outside of the housing 102.

The load sensor 114 can be arranged to couple with at least a portion of the load receiving element 1008, and the housing 102 can be operably arranged to be disposed over the load sensor 114, thereby providing protection for the load sensor 114 from damage.

The load sensor 114 can be operably coupled with at least a portion of the load receiving element 1008 via an adhesive (e.g. silicone, etc.), a fastener, a bracket, and/or any combination thereof.

Figure 2:
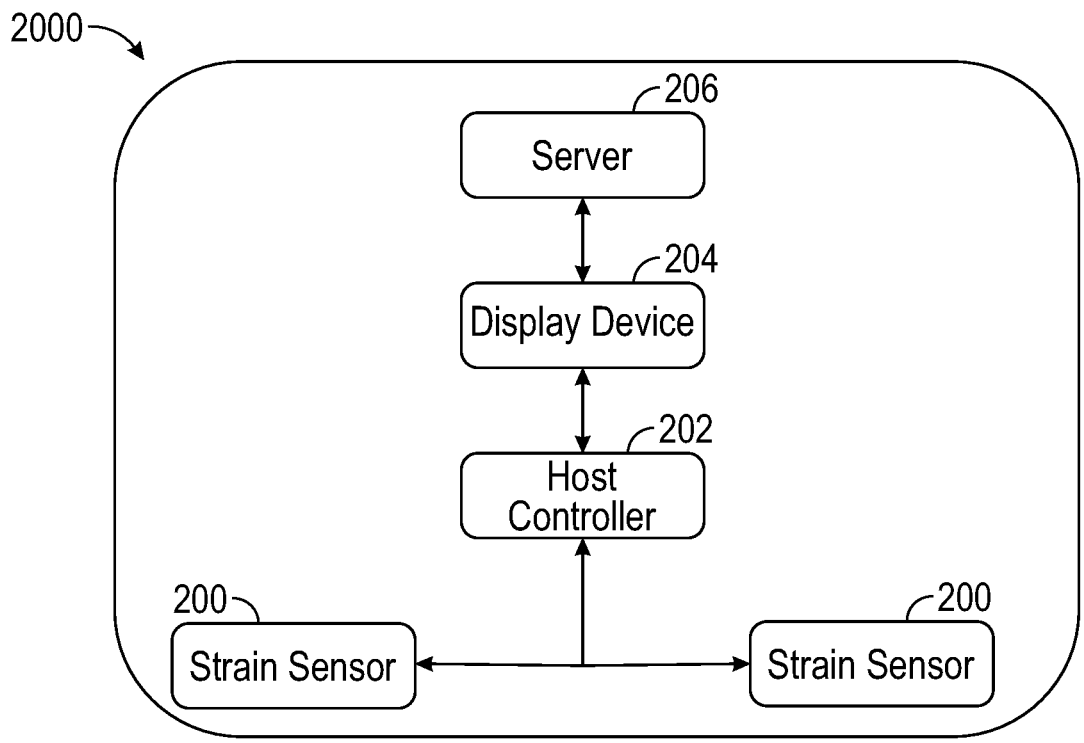
FIG. 2 is a diagrammatic representation of a wireless scale system coupled with a communication system, according to at least one instance of the present disclosure.

FIG. 2 illustrates a diagrammatic view of a wireless scale system coupled with a communication host, according to at least one instance of the present disclosure. The wireless scale system 2000 can include one or more wireless scale devices 200 (for example, as shown as FIGS. 1A-1C) and can be operably coupled with a host controller 202. The host controller 202 can be operable to receive data from one or more wireless scale devices 200 coupled therewith.

The host controller 202 can be further operable transmit the received data to one or more display devices 204. The one or more display devices 204 can be operable to display and/or otherwise present the received data to a user. In at least one instance, the display device 204 can indicate an estimated load measurement, an overweight alert, an underweight alert, and/or the like. The display device 204 can be a static display of data transmitted via the communication host 200, or the display device 204 can be a dynamic display allowing operator engagement to confirm alerts, display alternative settings, accept and/or request user feedback, adjustment, and/or otherwise provide user engagement. The display device 204 can also communicate with one or more remote storage device(s) 206 (e.g. local server, remote server, cloud-based storage, etc.). The data logging can allow audits of the loading of a load receiving element as measured by the wireless scale device(s) 200. In at least one instance, the received data can be stored and/or logged on the one or more remote storage devices 206 for data logging purposes, creating data training sets, individual analysis, and/or aggregated analysis.

Figure 3:
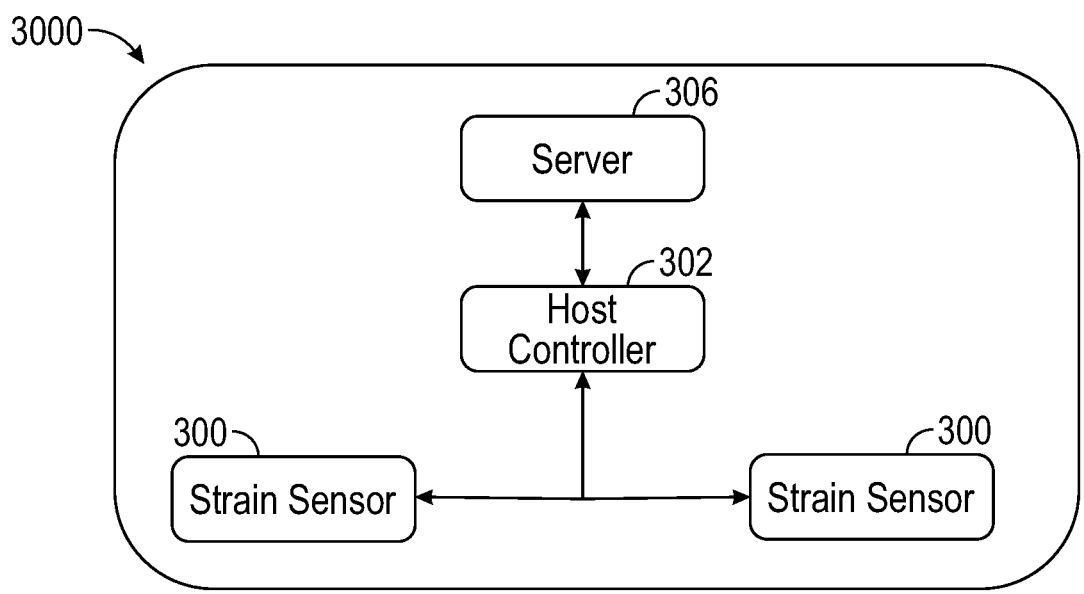
FIG. 3 is a diagrammatic representation of a wireless strain system, according to at least one instance of the present disclosure.

FIG. 3 illustrates a diagrammatic view of a wireless strain system coupled with a communication, according to at least one instance of the present disclosure. The wireless strain system 3000 can include one or more wireless strain devices 300 (for example, as shown as FIGS. 1A-1C) and can be operably coupled with a host controller 302. The host controller 302 can receive data from the one or more wireless strain devices 300 coupled therewith. The host controller 302 can transmit the received data to with one or more remote storage device(s) 306 (e.g. local server, remote server, cloud-based storage, etc.). The data logging with the one or more remote storage device 306 can allow audits of the loading of a load receiving element as measured by the wireless scale device(s) 200. In at least one instance, the received data can be stored and/or logged on the one or more remote storage devices 206 for data logging purposes, creating data training sets, individual analysis, and/or aggregated analysis. In at least one instance, the data logging and/or remote observation can allow for structural monitoring as measured by wireless strain system 3000 via the one or more wireless strain device(s) 300. This structural monitoring can be used for roofs, walls, bridges, and/or other load receiving elements.

While FIG. 2 and FIG. 3 illustrate a wireless sensor system, it is within the scope of the present disclosure to implement the wireless scale system with more or less components than those detailed with respect to FIG. 2 and FIG. 3 and in other arrangements and orders. The arrangement of elements in FIG. 2 and FIG. 3 are merely illustrative and do not imply any limitation as to the present disclosure. While illustrated with two wireless strain sensors 200, 300, respectively, communicatively coupled with a host controller 202, 302, respectively, it is within the scope of this disclosure to couple any number of wireless strain sensors with one or more host controllers, display devices, and/or servers. It is within the scope of this disclosure to implement the one or more wireless strain sensors 200, 300 with or without a host controller depending on the arrangement of the wireless strain system. In this instance, the one or more wireless strain sensors 200, 300 can be coupled with one or more display devices or servers.

Further, while FIG. 2 and FIG. 3 illustrate the display device 204 and/or server 206, 306 coupled with one host controller, it is within the scope of this disclosure that the display device and/or server can couple with one or more host controllers, each coupled with any number of wireless strain sensors. In at least one instance, a server can be communicatively coupled with a plurality of host controllers with each host controller coupled with a plurality of wireless strain sensors.

Figure 4:
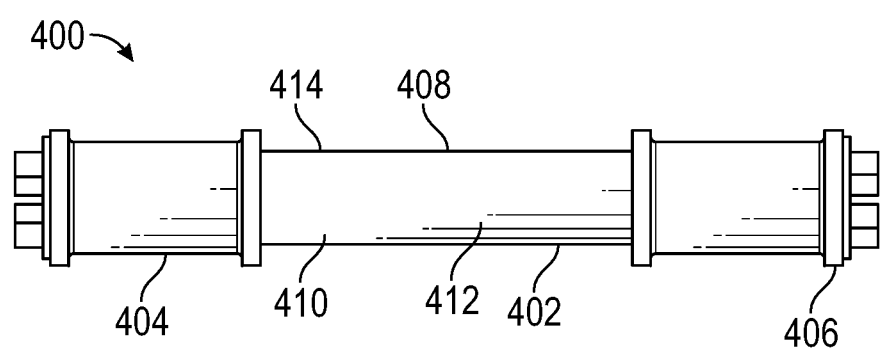
FIG. 4 is a top planar view of a second instance of a wireless scale system, according to at least one instance of the present disclosure.

FIG. 4 illustrates a second embodiment of a wireless scale device, according to at least one instance of the present disclosure. A wireless scale device 400 can be operably arranged to determine a change in strain corresponding to a mass, load, and/or other force of an associated element. In at least one instance, the wireless scale device 400 can have a load cell beam 402 disposed between two battery housings 404, 406 arranged at each distal end of the load cell beam 402. A load cell sensor 408 can be disposed on one or more surfaces of the load cell beam 402 to determine measurable strain on the load cell beam 402.

In at least one instance, the load cell sensor 408 can be a strain gauge coupled with the load cell beam 402 measuring the strain induced into the load cell beam 402 caused by a mass and/or load on the element coupled with the wireless scale device 400. The load cell sensors 408 can be operably arranged on a top surface of the load cell beam 402, a bottom surface of the load cell beam 402, and/or any combination thereof. One or more components of the wireless scale device 400 including, but not limited to, a PCB 410 and/or an antenna 412 can be operably arranged below the load cell beam 402.

The wireless scale device 400 can include a protective coating 414 operably disposed around one or more portions of the wireless scale device 400 including, but not limited to, the load cell beam 402, the load cell sensor 408, the PCB 410, the antenna 412, and/or at least a portion of the battery housings 404, 406. The protective coating 414 can be operably to provide environmental protection from wind, rain, and/or debris during operation of the wireless scale device 400.

Figure 5:
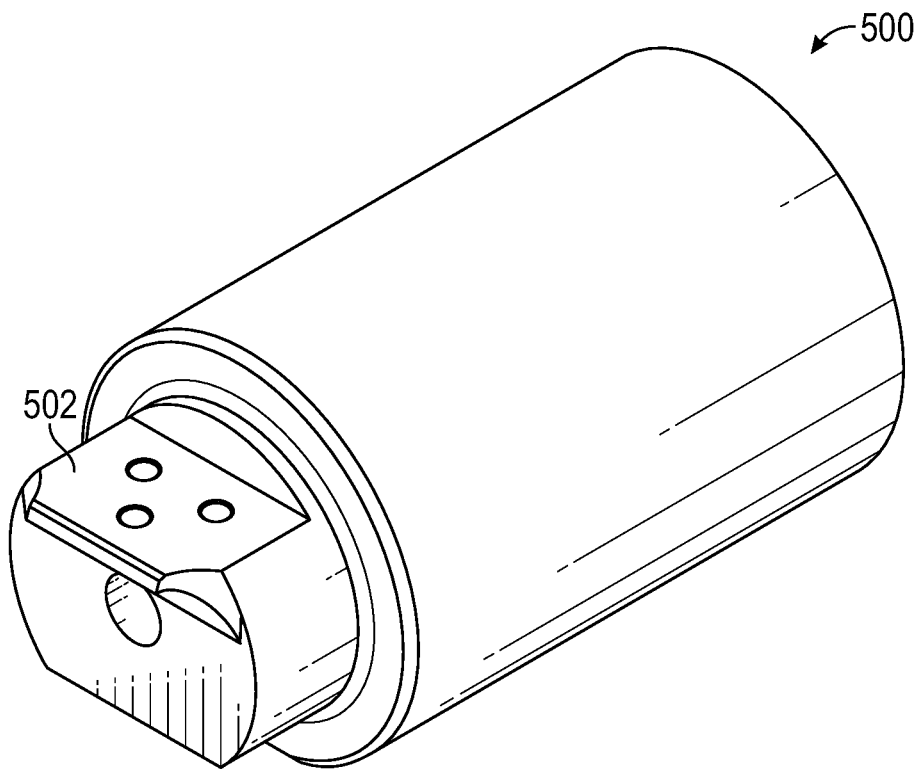
FIG. 5 is an isometric view of a battery housing of the second instance of a wireless scale system, according to at least one instance of the disclosure.

FIG. 5 illustrates a battery housing, according to at least one instance of the present disclosure. The battery housing 500 can be implemented as at least one of the battery housings 404, 406 described with respect to FIG. 4 and/or in conjunction with the load cell beam 402. The battery housing 500 can have a load cell coupling portion 502 operable to receive and/or couple the load cell beam 402 with the battery housing 500. The load cell coupling portion 502 can be operably arranged to receive a load cell beam 402 welded thereto. In other instances, the load cell coupling portion can be operably arranged to receive a load cell beam 402 bolted and/or otherwise fastened thereto.

In at least one instance, the load cell beam 402 and/or the load cell coupling portion 502 can include a bolt pattern of one or more apertures through each respective surface, thereby providing alignment between the load cell beam 402 and/or the load cell coupling portion 502. In some instances, the bolt pattern can be implemented for alignment purposes only, and in yet other instances the bolt pattern can be implemented for coupling purposes.

The load cell coupling portion 502 can be a slot and/or groove formed into one end of the battery housing 500. The slot can be operably arranged to receive at least a portion of the load cell beam 402 therein.

Figure 6:
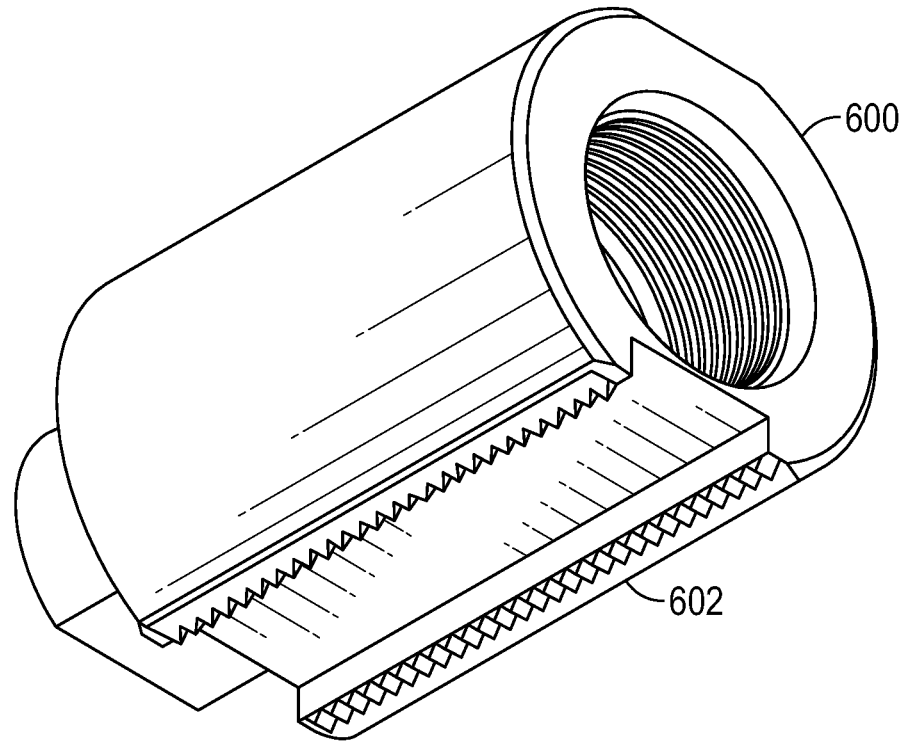
FIG. 6 is a bottom isometric view of a battery housing of the second instance of a wireless scale system, according to at least one instance of the present disclosure.

FIG. 6 illustrates a battery housing bottom surface, according to at least one instance of the present disclosure. A battery housing 600 operably implemented with the load cell beam 402 can include one or more features to assist in keeping the wireless scale device 400 in place during extreme conditions (e.g. vibration, etc.). The battery housing 600 can include a raised and/or grooved bottom surface 602, thereby increasing surface area contact between the battery housing 600 and a coupling surface. In at least one instance, the battery housing 600 can have machined slots, grooves, teeth, welded teeth, and/or an otherwise knurled surface providing better coupling between the battery housing 600 and an adjacent coupling surface.

Figure 7:
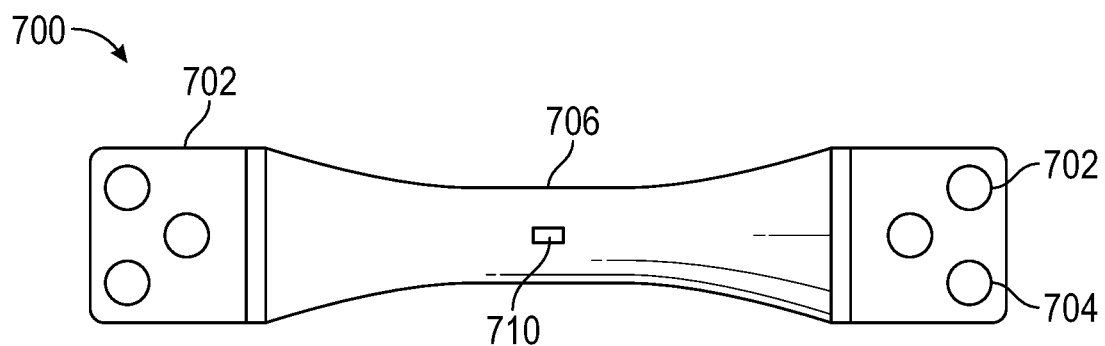
FIG. 7 is a top planar view of a load cell beam of the second instance of a wireless scale system, according to at least one instance of the present disclosure.
Figure 8:
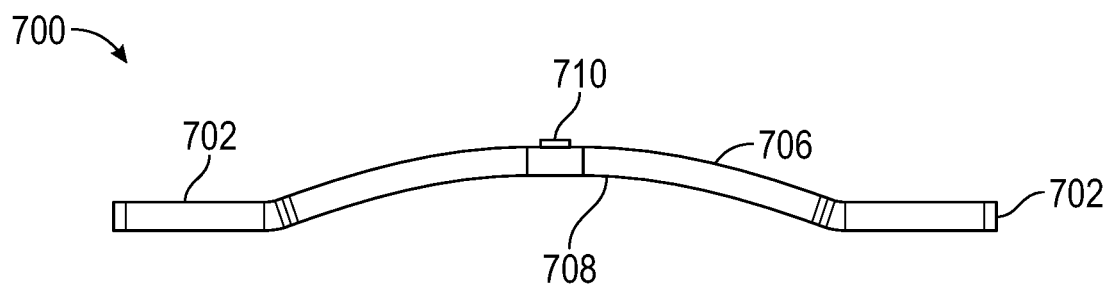
FIG. 8 is a side planar view of a load cell beam of the second instance of a wireless scale system, according to at least one instance of the present disclosure.

FIG. 7 is a top down view of a load cell beam, according to at least one instance of the present disclosure. FIG. 8 is a side plane view of a load cell beam according to at least one instance of the present disclosure. The load cell beam 700 can be implement within the wireless safety device 400 described above with respect to FIG. 4. The load cell beam 700 can have longitudinally disposed end portions 702 and a center portion 706 disposed therebetween. The end portions 702 can be operable to couple with at least one battery housing 404, 406, 500, 600 to substantially form the wireless safety device 400.

The end portions 702 can have a bolt pattern 704 formed therein for fastening and/or aligning the load cell beam 700 with respect to the battery housing 404, 406, 500, 600. While a three aperture bolt pattern 704 is illustrate with respect to FIG. 7, it is within the scope of this disclosure to implement any bolt pattern 704 operable to align and/or fasten the load cell beam 700 with the battery housing.

The center portion 706 of the load cell beam 700 can be operable to receive a load cell sensor 710 thereon to measure the deflection, deformation, and/or other deviation of the load cell beam 700. In at least one instance, the center portion 706 can be necked and/or filleted to reduce the lateral cross-section along the longitudinal length. The necking and/or filleting of the center portion 706 can amplify and/or concentrate the measurable deflection, deformation and/or deviation for the load cell sensor 710, thereby providing a more accurate and precise measurement of the load experienced by the load cell beam 700.

As can further be appreciated in FIG. 8, the load cell beam 700 can have an arched center portion 706, thereby further amplifying and/or concentrating the load cell sensor 710 measurement. The arched portion of the center portion 706 requires sufficient arch so as to allow substantially continuous positive readings from the load cell sensor 710 (e.g. the arch does not invert under operable load) without being so arched so as to prevent coupling between the load cell sensor 710 and the center portion 706.

Figure 9:
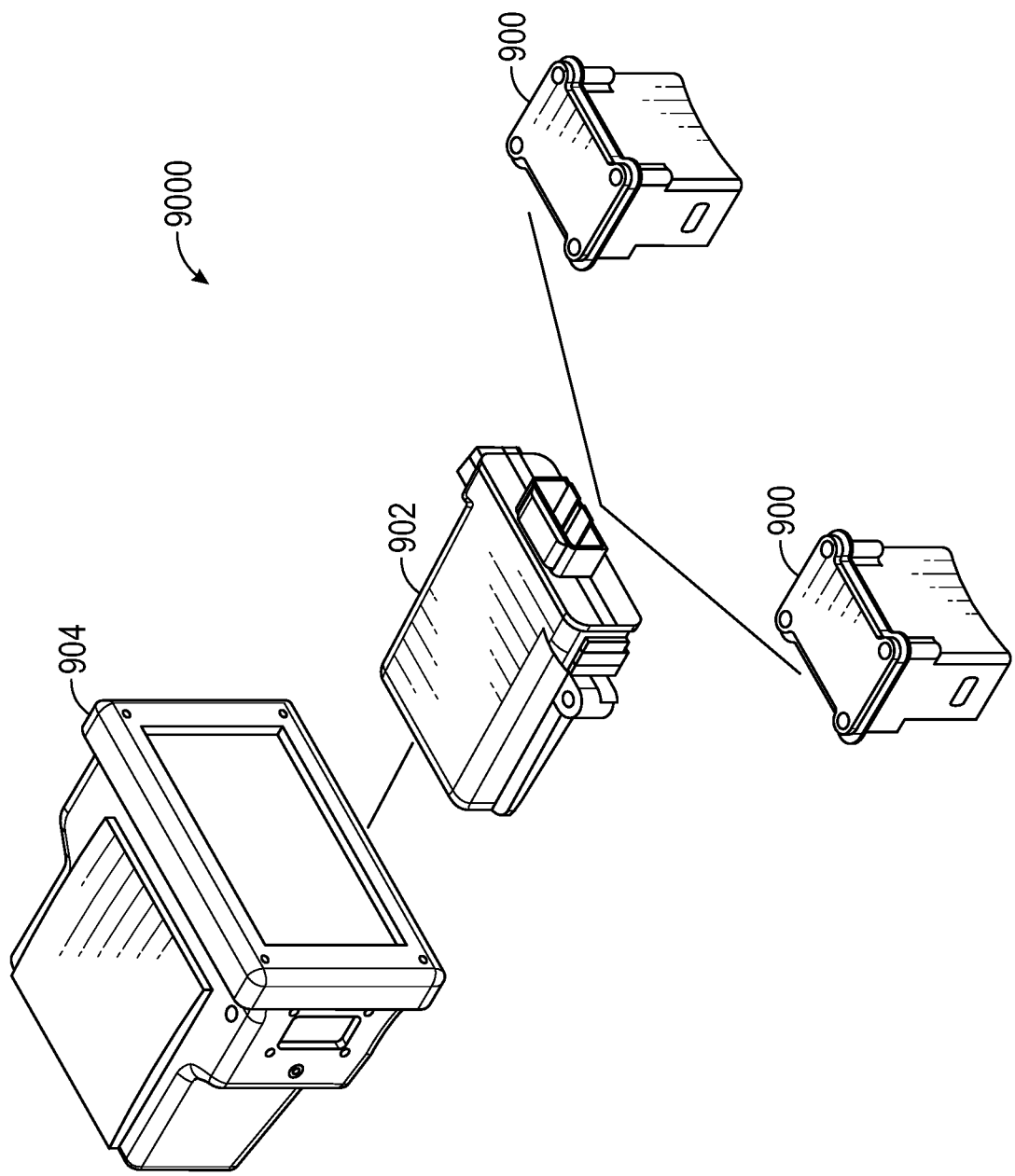
FIG. 9 is a diagrammatic view of wireless scale system with a communication host, according to at least one instance of the present disclosure.

FIG. 9 illustrates a diagrammatic view of a wireless scale system coupled with a communication system, according to at least one instance of the present disclosure. The wireless scale system 9000 can include one or more wireless scale devices 900 and can be operably coupled with a communication host 902. The communication host 902 can receive data from the one or more wireless scale devices 900 coupled therewith. The communication host 902 can transmit the received data to a display 904 operable to communicate to a user one or more measurements made by the one or more wireless scale devices 900. The display 904 can indicate an estimated load measurement, an overweight alert, an underweight alert, and/or the like. The display 904 can be a be a static display of data transmitted via the communication host 902, or the display 904 can be a dynamic display allowing operator engagement to confirm alerts, display alternative settings, and/or otherwise provide user engagement.

As will be discussed in more detail with respect to FIG. 10, the communication host 902 can wirelessly communicate with a storage device (not shown) for data logging purposes. The storage device can be local to the load receiving element 1008 (e.g. axle of the vehicle), and/or a remote storage (e.g. server, cloud-based storage). The data logging can allow audits of the loading of a load receiving element 1008 as measured by the wireless scale device(s) 900.

FIG. 10 illustrates a diagrammatic view of a wireless scale communication system, according to at least one instance of the present disclosure. The wireless scale communication system 1000 can be wirelessly coupled with one or more electronic devices 1002 (e.g. display 904) to communicatively transmit data measured by the load cell 1004. The wireless scale system 1000 can advise of weight management, fleet management, pick-up/delivery management, and/or unscheduled weight changes.

The wireless scale system 1000 can commutatively coupled with an operator's electronic device 1002 to provide real-time feedback regarding the load 1010 of transportation vehicle 1006 (e.g. 18-wheeler, etc.). The electronic device 1002 can display a weight regarding the load 1010 as measured by the load cell 1004 and/or a status as to whether the measured weight exceeds a predetermined threshold guided by the operator, fleet manager, and/or vehicle 1006 manufacturer. Additionally, the load cell 1004 can provide real-time updates to the one or more electronic devices and/or servers 1002 regarding weight changes.

The wireless scale system 1000 can also be implemented in a fleet management arrangement allowing an operator to manage a fleet of transportation vehicles 1006 in real-time via the load cell 1004 data from each respective vehicle 1006. In at least one instance, the fleet manager can receive load 1010 information for each respective fleet vehicle 1006 and coordinate pick-up and/or delivery arrangements based on available load 1010 space within a given vehicle 1006 and its respective location. The fleet manager can also track pick-up and/or delivery schedules based on the load 1010 change (and/or lack of load 1010 change) of a given vehicle 1006.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims.

What is claimed is:

1. A wireless scale apparatus comprising:
    a housing having one or more receiving portions formed therein;
    a printed circuit board (PCB) operably coupled with a power source, an antenna, and a load sensor, wherein the load sensor is operable to be directly coupled with a portion of a load receiving element, the PCB having one or more processors, and a non-transitory computer-readable medium comprising executable instructions, which when executed by a processor, causes the processor to:
    measure load data from the load sensor;
    determine a load measurement from the load data received upon the load sensor; transmit the load measurement,
    wherein the PCB, the power source, and the antenna are contained within the one or more receiving portions of the housing,
    wherein the housing is operable to be disposed over the load sensor that is directly coupled with the portion of the load receiving element,
    wherein the load receiving element includes an axle of a vehicle.

2. The wireless scale apparatus of claim 1, wherein the load sensor is a Wheatstone bridge.

3. The wireless scale apparatus of claim 1, wherein the load sensor is a strain gauge.

4. The wireless scale apparatus of claim 1, wherein the load receiving element includes a suspension element upon which a measurable load is to be received.

5. The wireless scale apparatus of claim 1, wherein the power source is a non-chargeable battery.

6. The wireless scale apparatus of claim 1, wherein the power source is a kinetic power source.

7. The wireless scale apparatus of claim 1, wherein the load measurement is transmitted to a communication host via the antenna.

8. The wireless scale apparatus of claim 1, wherein the load sensor is operably received in a receiving portion of the one or more receiving portions, the receiving portion disposed on the bottom surface of the housing.

9. The wireless scale apparatus of claim 1, wherein the load sensor is directly coupled with the load receiving element by adhesion.

10. A wireless scale system comprising:
    a communication host;
    one or more wireless scale apparatuses, operably coupled to the communication host, the one or more wireless scale apparatuses comprising:
    a housing having one or more receiving portions formed therein;
    a printed circuit board (PCB) operably coupled with a power source, an antenna, and a load sensor, wherein the load sensor is operable to be directly coupled with a portion of a load receiving element, the PCB having one or more processors, and a non-transitory computer-readable medium comprising executable instructions, which when executed by a processor, causes the processor to:
    measure load data from the load sensor;
    determine a load measurement from the load data received upon the load sensor;
    transmit the load measurement via the communication host, a display operably coupled with the communication host, the display operable to display one or more load measurements received from the one or more wireless scale apparatuses, wherein the PCB, the power source, and the antenna are contained within the one or more receiving portions of the housing, wherein the housing is operable to be disposed over the load sensor that is directly coupled with the portion of the load receiving element, wherein the load receiving element includes an axle of a vehicle.

11. The wireless scale system of claim 10, wherein the load sensor is a Wheatstone bridge.

12. The wireless scale system of claim 10, wherein the load sensor is a strain gauge.

13. The wireless scale system of claim 10, wherein the power source is a non-chargeable battery.

14. The wireless scale system of claim 10, wherein the power source is a kinetic power source.

15. The wireless scale system of claim 10, wherein the load measurement is transmitted to the communication host via the antenna.

16. The wireless scale system of claim 10, wherein the load receiving element includes a suspension element upon which a measurable load is to be received.

17. The wireless scale system of claim 10, wherein the load sensor is operably received in a receiving portion of the one or more receiving portions, the receiving portion disposed on the bottom surface of the housing.

18. The wireless scale system of claim 10, wherein the load sensor is directly coupled with the load receiving element by adhesion.

* * * * *